(12) United States Patent
Tabata et al.

(10) Patent No.: US 6,556,317 B2
(45) Date of Patent: *Apr. 29, 2003

(54) IMAGE READING APPARATUS AND IMAGE READING SYSTEM

(75) Inventors: Masami Tabata, Isehara (JP); Tatsundo Kawai, Hadano (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 116 days.

(21) Appl. No.: 08/900,342

(22) Filed: Jul. 25, 1997

(65) Prior Publication Data

US 2002/0030862 A1 Mar. 14, 2002

(30) Foreign Application Priority Data

| Aug. 2, 1996 | (JP) | 8-204899 |
| Aug. 2, 1996 | (JP) | 8-204900 |
| Jul. 14, 1997 | (JP) | 9-188216 |

(51) Int. Cl.[7] .......................... H04N 1/46; H01J 40/14
(52) U.S. Cl. ............... 358/509; 358/511; 250/578.1
(58) Field of Search .................. 358/509, 511, 358/474, 475; 250/578.1, 226, 208.1, 216; 382/162; 356/406, 407; H01N 1/46

(56) References Cited

U.S. PATENT DOCUMENTS

| 4,270,047 A | * | 5/1981 | Mochizuki et al. ...... 250/208.1 |
| 4,558,357 A | * | 12/1985 | Nakagawa et al. ......... 358/514 |
| 4,675,727 A | * | 6/1987 | Sekizawa et al. ........... 358/533 |
| 4,680,644 A | | 7/1987 | Shirato et al. ................ 358/294 |
| 4,691,228 A | * | 9/1987 | Nagano ...................... 358/509 |
| 4,791,493 A | | 12/1988 | Ogura et al. ................. 358/294 |
| 4,926,058 A | | 5/1990 | Iwamoto et al. ............ 250/578 |
| 4,996,606 A | | 2/1991 | Kawai et al. ................ 358/475 |
| 5,019,897 A | * | 5/1991 | Shirata et al. ............... 358/509 |
| 5,101,285 A | | 3/1992 | Kawai et al. ................ 358/471 |
| 5,187,595 A | | 2/1993 | Kitani et al. ................. 358/482 |
| 5,233,442 A | | 8/1993 | Kawai et al. ................ 358/482 |
| 5,233,469 A | * | 8/1993 | Araki .......................... 359/652 |
| 5,272,548 A | | 12/1993 | Kawai et al. ................ 358/482 |
| 5,625,470 A | * | 4/1997 | Ueta et al. ................... 358/509 |
| 5,717,502 A | * | 2/1998 | Kawai ......................... 358/471 |
| 5,859,712 A | * | 1/1999 | Kim ............................. 358/514 |
| 5,933,181 A | * | 8/1999 | Shimizu et al. ............. 347/232 |
| 2002/0036255 A1 | * | 3/2002 | Ogi et al. ................. 250/208.1 |

FOREIGN PATENT DOCUMENTS

GB     2 217 950     11/1989     ............ H04N/1/46

OTHER PUBLICATIONS

European Search Report, Jul. 11, 2000, Examiner C. Dudley.

* cited by examiner

*Primary Examiner*—Kimberly A. Williams
(74) *Attorney, Agent, or Firm*—Fitzpatrick, Cella, Harper & Scinto (57) ABSTRACT

In an image sensor which has a photoelectric conversion element group, an illumination device having light sources of at least three emission colors R, G, and B, an imaging lens, and the like, moire noise in a color output image is eliminated, the original reading time is shortened, and a cost reduction is attained. For this purpose, a sensor array including a linear array of a plurality of photoelectric conversion elements, a lens array for imaging an original image on the sensor array, an illumination device using LEDs having emission colors R, G, and B, and a cover glass are supported by and fixed to a frame. The conjugate length of the lens array is set to fall within the range between the R and G emission wavelengths. An original pressed against the cover glass is illuminated by the illumination device, and light reflected by the original is converted into electrical signals by the sensor array, thereby reading the original image.

78 Claims, 8 Drawing Sheets

IMAGE READING APPARATUS AND IMAGE READING SYSTEM

BACKGROUND OF THE INVENTION

1. Field of the Invention

The present invention relates to an image reading apparatus for especially reading a color original image and an image reading system using the same.

2. Related Background Art

Figure 13:
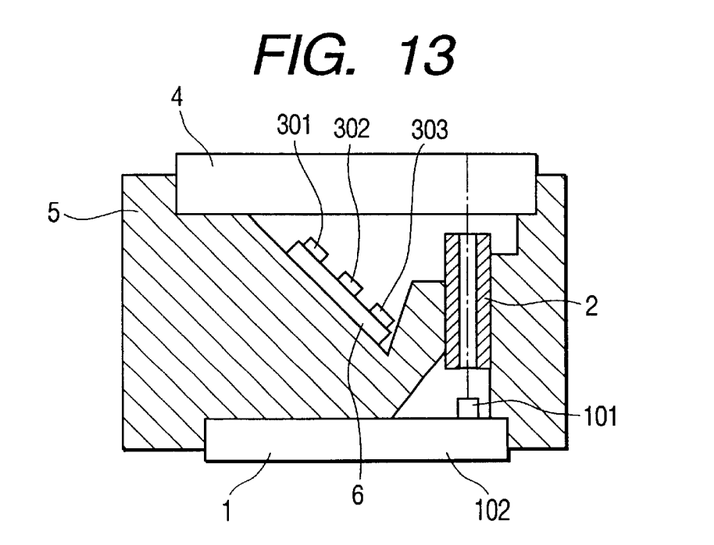
FIG. 13 is a sectional view showing the arrangement of an image sensor.

FIG. 13 is a sectional view showing an example of an image sensor. This sensor is constituted by a sensor array 1 which is prepared by mounting a sensor IC 101 on a sensor board 102, a lens array 2, an LED array 6 having three different LED elements 301, 302, and 303 serving as light sources for illuminating an original, a cover glass 4, and a frame 5 for holding these components in position.

The LED array 6 is constituted by mounting, on the board, a plurality of three different types of LED elements 301, 302, and 303, for example, 20 or more elements on each line to obtain a uniform illuminance distribution of an original upon reading an A4-size original.

The emission peak wavelengths of the three different LED elements 301, 302, and 303 are respectively 430 (nm) corresponding to blue, 570 (nm) corresponding to green, and 660 (nm) corresponding to red.

The lens array 2 is formed by arranging a plurality of columnar lens elements on a line to provide a lens function by setting gradually different refractive indices between the peripheral portion and the central portion.

Also, as the lens array 2, one having a small aperture angle is selected angle since some color originals are adhered with pictures and have three-dimensional patterns on their surface and, hence, a focal length of about 0.5 (mm) is required. Furthermore, a lens array 2 having small chromatic aberrations is selected so that R, G, and B light beams can obtain substantially equal resolutions on the corresponding sensors.

In general, a lens array having an aperture angle of about 12 (deg.) is used, and a conjugate length (TC) as the distance between the original and sensor requires 18.3 (mm).

However, since the above-mentioned conventional image sensor uses a lens array with a small aperture angle, the light amount transmission efficiency is low, and an increase in original reading speed is limited.

In addition, in the lens array having a small aperture angle, distance from the original surface to the sensor is large, so that the size of the image sensor using such the lens array becomes large.

Furthermore, in the above-mentioned conventional image sensor, since the lens array equally inputs R, G, and B light beams onto the sensor array, a moire phenomenon appears, i.e., a very thin line in the read original is output as a shaggy line in the output image. Such phenomenon is especially conspicuous in a color original output image.

SUMMARY OF THE INVENTION

It is an object of the present invention to provide an image reading apparatus and system, which can complete reading within a short period of time.

It is another object of the present invention to provide a compact, inexpensive image reading apparatus and system.

It is still another object of the present invention to eliminate production of moire noise upon reading a color image.

In order to achieve the above objects, according to one embodiment of the present invention, an image reading apparatus comprises: a photoelectric conversion element; an illumination device having light sources of first, second, and third colors having longer emission wavelengths in the order named; an imaging member for imaging light reflected by an original illuminated by the illumination device onto the photoelectric conversion element; and a support member for supporting the original, wherein an optical distance from a center of the imaging member to the photoelectric conversion element is set at ½ of a conjugate length of light having a wavelength longer than a peak value of the emission wavelength of the light source of the second color, and an optical distance from the center of the imaging member to a surface of the original supported by the support member is set at ½ of a conjugate length of light of the emission wavelength having a conjugate length shorter than the conjugate length.

According to another embodiment of the present invention, an image reading system comprises: a photoelectric conversion element; an illumination device having light sources of first, second, and third colors having longer emission wavelengths in the order named; an imaging member for imaging light reflected by an original illuminated by the illumination device onto the photoelectric conversion element; a support member for supporting the original; and control means for controlling the photoelectric conversion element and the illumination device, wherein an optical distance from a center of the imaging member to the photoelectric conversion element is set at ½ of a conjugate length of light having a wavelength longer than a peak value of the emission wavelength of the light source of the second color, and an optical distance from the center of the imaging member to a surface of the original supported by the support member is set at ½ of a conjugate length of light of the emission wavelength having a conjugate length shorter than the conjugate length.

According to still another embodiment of the present invention, an image reading apparatus comprises: a photoelectric conversion element; an illumination device having light sources of first, second, and third colors having longer emission wavelengths in the order named; an imaging member for imaging light reflected by an original illuminated by the illumination device onto the photoelectric conversion element; and a support member for supporting the original, wherein an optical distance from a center of the imaging member to the photoelectric conversion element is set at ½ of a conjugate length at the emission wavelength of the light source of the third color, and an optical distance from the center of the imaging member to a surface of the original supported by the support member is set at ½ of a conjugate length at the emission wavelength of the light source of the second color.

According to still another embodiment of the present invention, an image reading system comprises: a photoelectric conversion element; an illumination device having light sources of first, second, and third colors having longer emission wavelengths in the order named; an imaging member for imaging light reflected by an original illuminated by the illumination device onto the photoelectric conversion element; a support member for supporting the original; and control means for controlling the photoelectric conversion element and the illumination device, wherein an optical distance from a center of the imaging member to the photoelectric conversion element is set at ½ of a conjugate length at the emission wavelength of the light source of the third color, and an optical distance from the center of the imaging member to a surface of the original supported by the support member is set at ½ of a conjugate length at the emission wavelength of the light source of the second color.

With the above arrangement, the reading time can be shortened while realizing size and cost reductions of the reading apparatus and system.

According to still another embodiment of the present invention, an image reading apparatus comprises: a photoelectric conversion element; an illumination device having light sources of first, second, and third colors having longer emission wavelengths in the order named; and an imaging member for imaging light reflected by an original illuminated by the illumination device onto the photoelectric conversion element, wherein a conjugate length TC of the imaging member is set to satisfy A≦TC≦B where A is the conjugate length at the emission wavelength of the light source of the second color, and B is the conjugate length at the emission wavelength of the light source of the third color.

According to still another embodiment of the present invention, an image reading system comprises: a photoelectric conversion element; an illumination device having light sources of first, second, and third colors having longer emission wavelengths in the order named; an imaging member for imaging light reflected by an original illuminated by the illumination device onto the photoelectric conversion element; and control means for controlling the photoelectric conversion element and the illumination device, wherein a conjugate length TC of the imaging member is set to satisfy A≦TC≦B where A is the conjugate length at the emission wavelength of the light source of the second color, and B is the conjugate length at the emission wavelength of the light source of the third color.

With the above-mentioned arrangement, a compact, inexpensive image reading apparatus and system can be provided, and production of moire upon reading a color image can be eliminated.

Other objects and advantages of the present invention will become apparent from the following specification and the accompanying drawings.

DETAILED DESCRIPTION OF THE PREFERRED EMBODIMENTS

An embodiment of the present invention will be described hereinafter with reference to the accompanying drawings.

Figure 1:
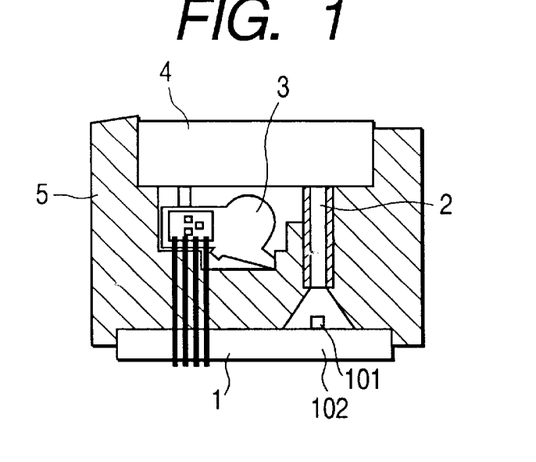
FIG. 1 is a sectional view showing the arrangement of an image sensor.
Figure 2:
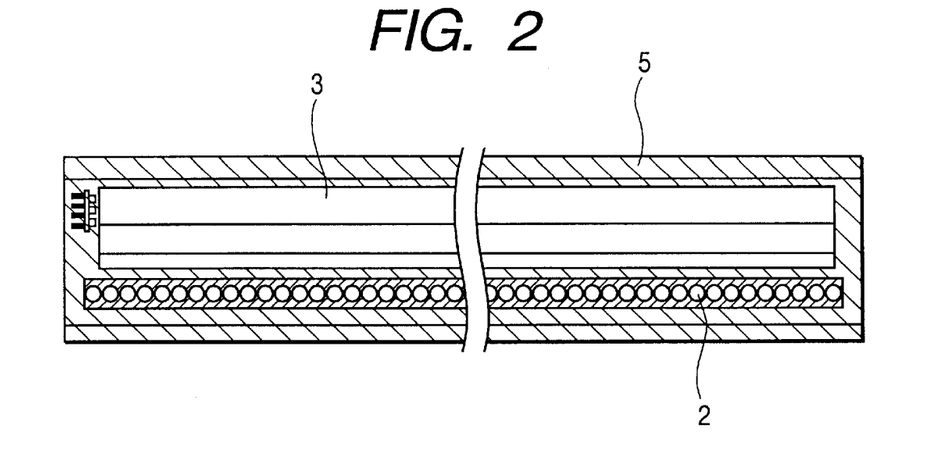
FIG. 2 is a top view showing the arrangement of the image sensor.

FIGS. 1 and 2 are respectively a sectional view and a top view showing the arrangement of an image sensor according to the present invention. This sensor is constituted by a sensor array 1 prepared by precisely arranging sensor ICs 101 each having a linear array of a plurality of photoelectric conversion elements in a plurality of lines on, e.g., a glass epoxy sensor board 102 in correspondence with the length of the original to be read, a lens array 2 for imaging light reflected by an original onto the sensor array 1, an illumination device 3 for irradiating light onto an original, a cover glass 4 consisting of a transparent light transmission member for supporting an original, and a frame 5 which supports these components in position and consists of a metal such as aluminum or the like or a resin such as polycarbonate or the like.

The mechanism of the sensor with the above-mentioned arrangement is as follows. That is, the illumination device 3 selectively irradiates three, R, G, and B light beams in turn from an oblique direction of about 45° onto an original pressed against and supported by the cover glass 4, and the lens array 2 images three, R, G, and B optical information signals reflected by the original onto the sensor IC 101. The sensor IC 101 photoelectrically converts the three, R, G, and B optical information signals into electrical signals and supplies them to a system. The system processes the three, R, G, and B electrical signals to reproduce a color image.

Figure 3:
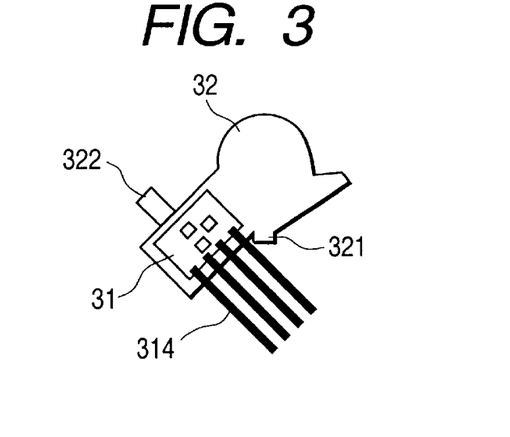
FIG. 3 is an enlarged sectional view of an illumination device shown in FIG. 1.
Figure 4:
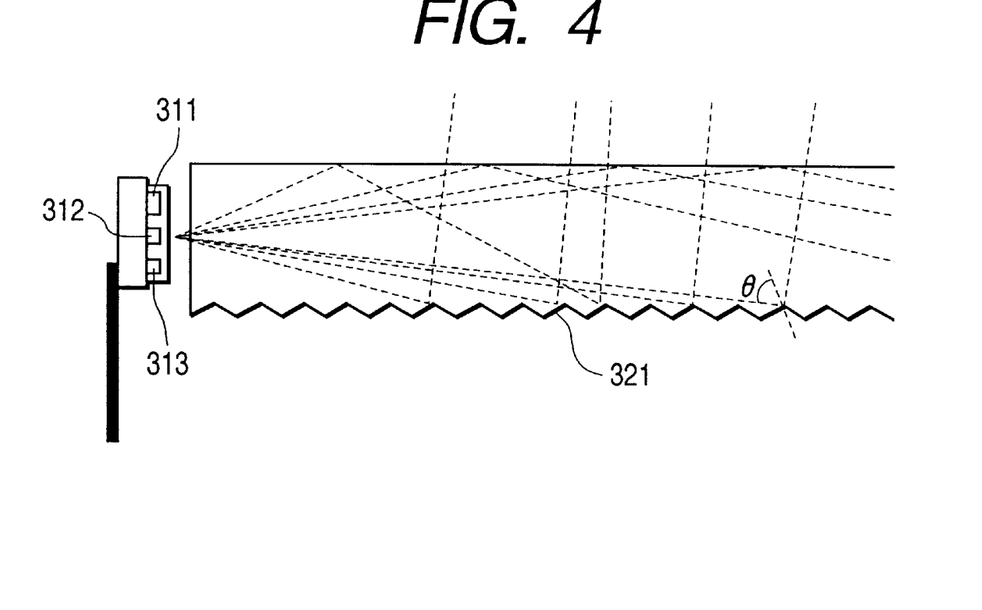
FIG. 4 is an enlarged side view of the illumination device shown in FIG. 1.

As shown in the enlarged views of FIGS. 3 and 4, the illumination device 3 is made up of a three-color, RGB LED chip 31 which includes R, G, and B LED elements 311, 312 and 313 as light sources in a single package, and a light guide member 32 which guides light beams emitted by these elements and outputs them in a desired direction, and uses a member such as an acrylic resin having high light transmission characteristics. Also, in FIGS. 3 and 4, lead pins 314 are connected to the chip 31, and the light guide member 32 has a sawtooth portion 321 and a projecting portion 322.

The peak emission wavelengths of the R, G, and B LED elements are respectively selected to be 620 (nm), 530 (nm), and 470 (nm) so as to improve color reproducibility and to reduce chromatic aberration as much as possible. Note that these peak emission wavelengths need only fall within the ranges from 590 to 630 (nm), from 510 to 550 (nm), and 450 to 490 (nm), respectively.

The LED chip 31 is arranged to input light from one edge portion in the longitudinal direction of the light guide member 32 into the light guide member 32, and the input light propagates inside the light guide member 32 while repetitively undergoing total reflections at the interface between the light guide member 32 and air.

As shown in FIGS. 3 and 4, the small-pitched sawtooth portion 321 is formed on the light guide member 32 to extend in its longitudinal direction. Of light components that propagate inside the light guide member, only light components entering the sawtooth portion 321 are largely deflected toward the original surface unlike reflections at other surfaces, and cease to satisfy the total reflection condition at the next interface between the light guide member 32 and air. In this manner, such light components are output in a desired direction.

Such sawtooth portion 321 may be formed by a reflection surface prepared by depositing aluminum or printing silver ink, white ink, or the like, or using total reflections at the interface between the sawtooth shape and air.

Alternatively, in place of forming a sawtooth shape, printing of white ink or roughening of the surface may simply provide the same effect.

In order to easily obtain uniform illuminance on the original surface, the sawtooth portion 321 may be tapered wider as the distance from the light source becomes larger, or the printed area may be gradually broadened in the case of simple white ink printing.

Also, the light guide member 32 may be covered with, e.g., a white member with high light reflection efficiency except for a light output portion toward the original, thus increasing the illuminance on the original surface.

Figure 5:
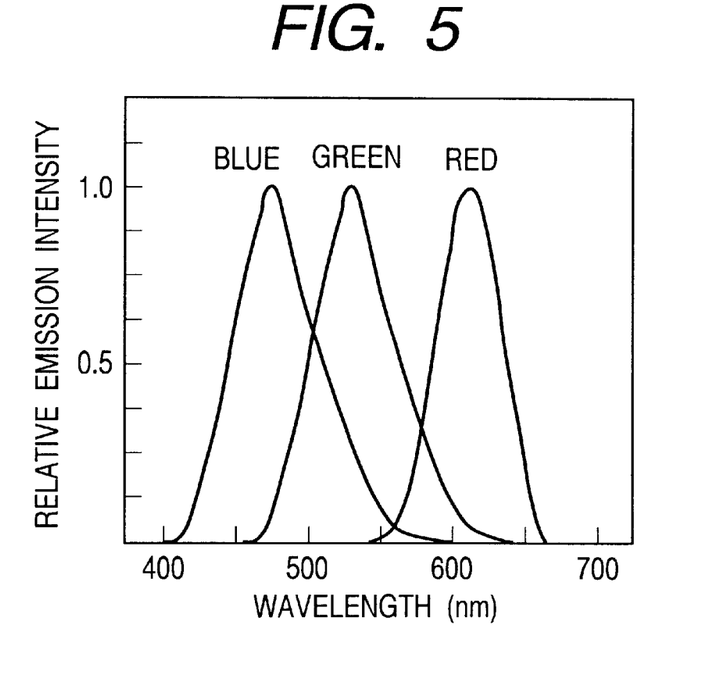
FIG. 5 is a graph showing the spectral characteristics of the individual light sources in the illumination device.

FIG. 5 shows the spectral characteristics of the light sources of the illumination device 3, i.e., the relationship between the R, G, and B wavelengths (nm) and the relative emission intensities.

The lens array 2 used in this embodiment is formed by linearly aligning a plurality of columnar lens elements each having a diameter of 0.6 (mm) with high precision so as to provide a lens performance by setting higher refractive indices from the peripheral potion toward the central portion by, e.g., ion exchange.

Figure 6:
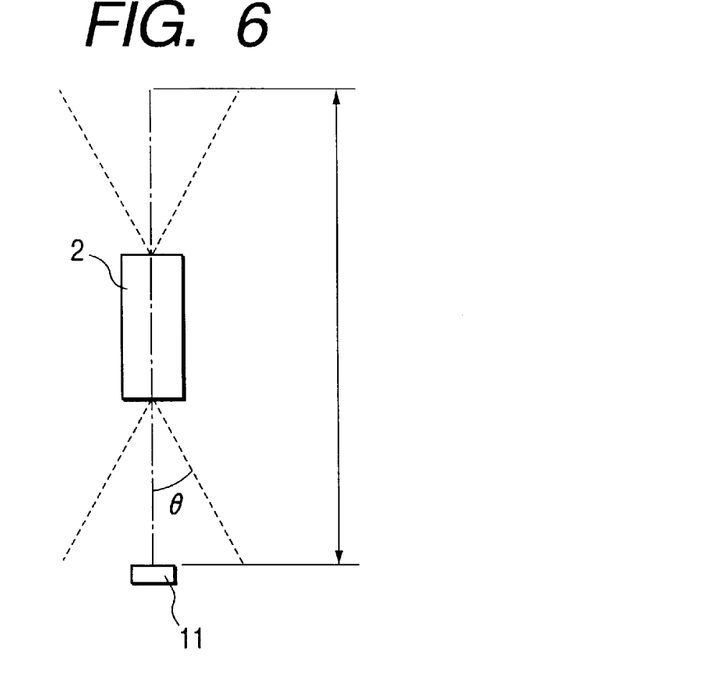
FIG. 6 is an explanatory view showing the imaging range of a lens array shown in FIG. 1.

FIG. 6 shows the imaging range of the lens array 2. The conventional color image sensor has a maximum aperture angle θ=12 (deg.) since it consists of a glass material suffering less chromatic aberration. However, the lens array 2 used in this embodiment can have an aperture angle θ=20 (deg.) or more since a glass material having proper chromatic aberration is selected.

As the aperture angle θ becomes larger, the amount of light fetched by the lens increases. For this reason, the light amount transmission efficiency is improved, and the lens array 2 having an aperture angle θ=20 (deg.) provides brightness about four times that provided by the conventional sensor having θ=12 (deg.).

On the other hand, a conjugate length TC (the distance from the original surface to the sensor surface) is 18.3 (mm) in the lens array having the aperture angle θ=12 (deg.), while it is 9 (mm) in the lens array having θ=20 (deg.).

Figure 7:
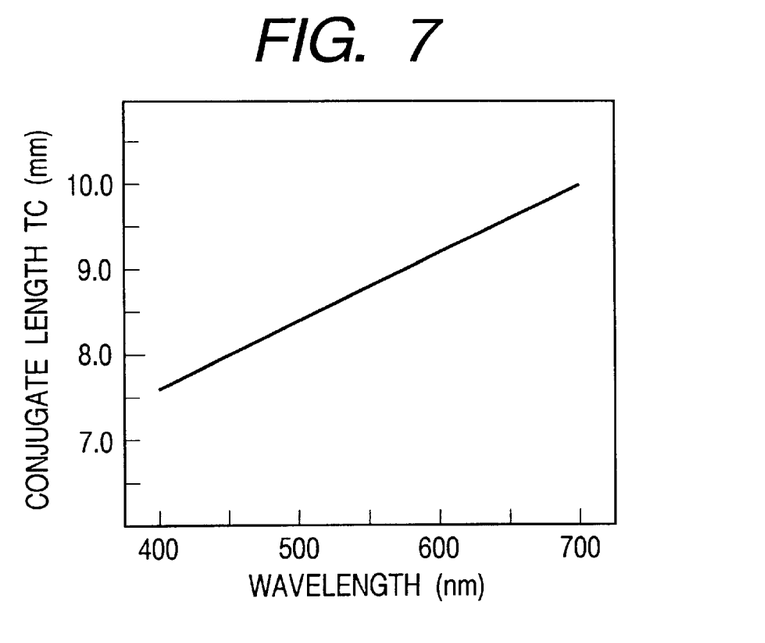
FIG. 7 is a graph showing the chromatic aberration of the lens array.

FIG. 7 shows the chromatic aberration of the lens array 2. As shown in FIG. 7, the conjugate length TC (the distance from the original surface to the sensor surface) is varied to obtain maximum resolutions in correspondence with the wavelengths of the light sources.

In this embodiment, as a light source, an R LED element having a peak wavelength λ=620 (nm) is selected, a G element having a peak wavelength λ=530 (nm) is selected, and a B element having a peak wavelength λ=470 (nm) is selected. For this reason, the conjugate lengths corresponding to maximum resolutions of these elements are respectively 9.4 (mm), 8.8 (mm), and 8.2 (mm).

In this embodiment, the dimensions of the frame 5 and the cover glass 4 are adjusted, so that an optical distance TC/2 between the sensor and the lens center is set to be 4.7 mm half the conjugate length for the R element, an optical distance TC'/2 between the cover glass surface and the lens center is set to be 4.4 (mm) half the conjugate length for the G element, and the total conjugate length TC is set at 9.1 (mm) nearly equal to the middle length between those for the R and G elements.

However, these dimensions are selected under the assumption that the optical path length of the lens is calculated based on air. However, if glass (refractive index n=1.51) other than air is present in the optical path, the thickness of the glass must be set by multiplying the optical path length by the refractive index of the glass.

Figure 8:
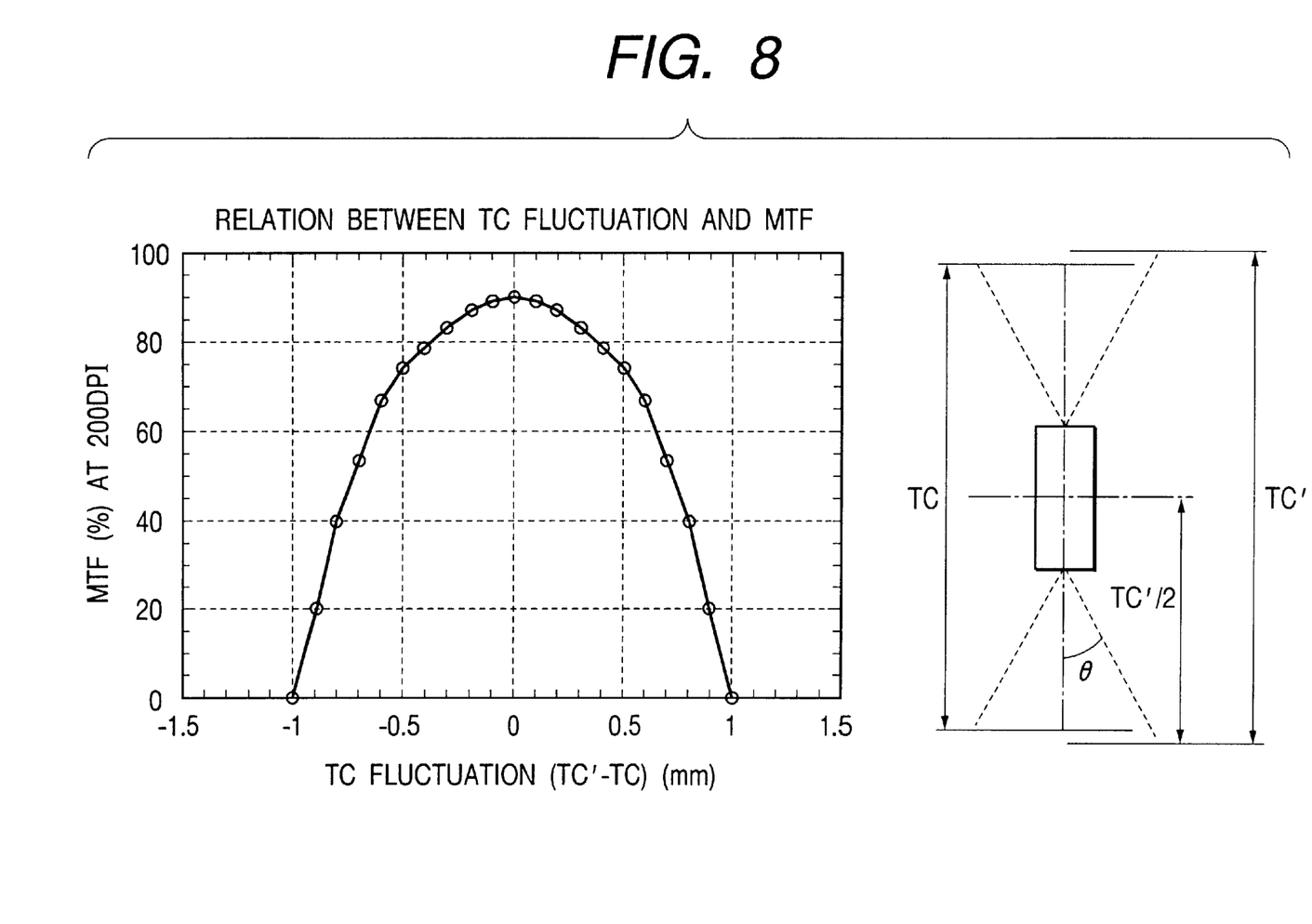
FIG. 8 is an explanatory view showing the relationship between the conjugate length fluctuation and MTF in the lens array.
Figure 9:
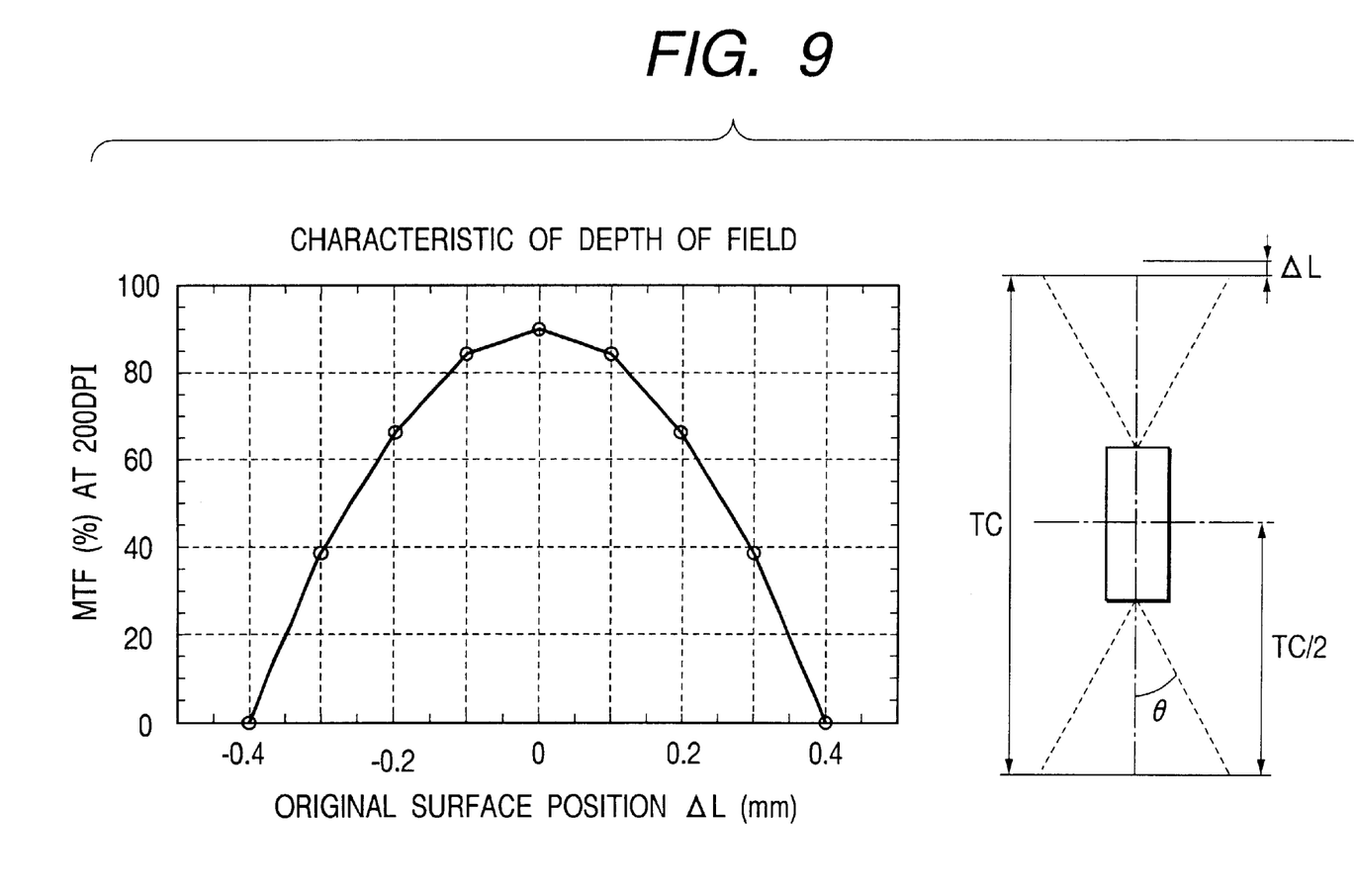
FIG. 9 is an explanatory view showing the focal depth characteristics of the lens array.

FIG. 8 shows changes in MTF (%) at 200 DPI when TC fluctuates, as the lens array characteristics of this embodiment. Also, FIG. 9 shows changes in MTF at 200 DPI owing to the difference between the optical distance TC/2 from the sensor to the lens center, and the optical distance TC'/2 from the original surface to the lens center. As can be seen from FIGS. 8 and 9, the highest MTF value can be obtained when these distances are equal to each other.

Figure 10:
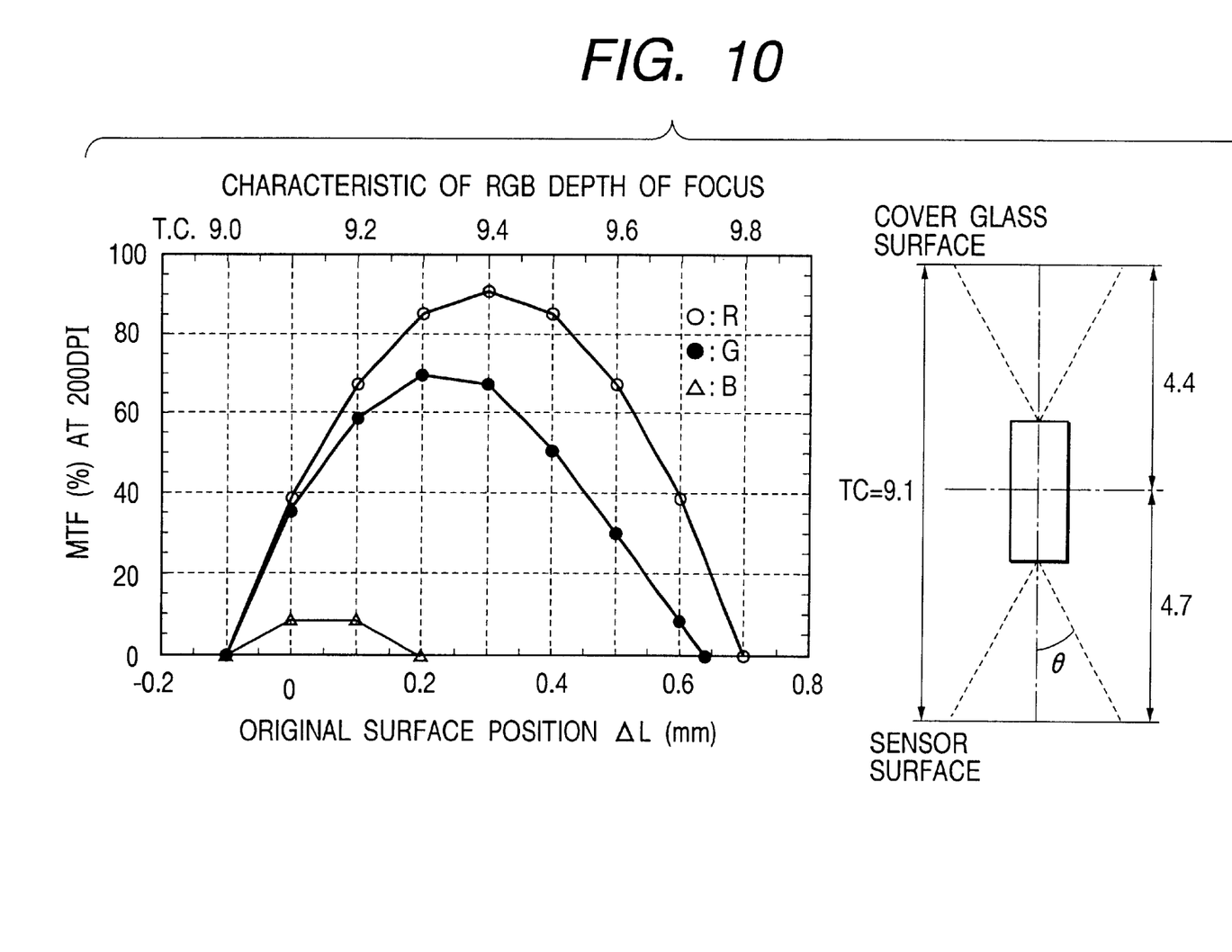
FIG. 10 is an explanatory view showing the R, G, and B focal depth characteristics.

The R, G, and B focal depth characteristics shown in FIG. 10 are derived from FIGS. 8 and 9 as those obtained when the cover glass surface of this embodiment is assumed to be 0.

The R and G depths of focus can assure an MTF value of 20% or more over a wide original surface position range of 0 to 0.5 (mm), and as for B, a resolution of 200 DPI cannot be obtained in most of the entire range. However, a practically satisfactory output image can be obtained as long as the R and G resolutions of three, R, G, and B primary colors are obtained.

When a color original is read using three color LED elements, the contrast of the dissected image is determined by the average of the three colors. Hence, the edge portion of a very thin line is appropriately blurred by B, and an optimal color output image free from any moiré can be obtained.

Even when the B resolution is lower than those of the remaining two colors of three, R, G, and B primary colors, the adverse influences on color images can be minimized.

Upon reading a monochrome original including many characters and the like, when one or both of the R and G elements are turned on, and the B element is turned off, even if the original slightly floats from the cover glass 4, an image having a required high resolution can be obtained.

In this embodiment, the conjugate length TC is adjusted just to the center of the conjugate lengths for R and G. Also, when the conjugate length TC is adjusted to fall within the range between the conjugate lengths TC for R and G, i.e., to satisfy (TC for R)≧TC≧(TC for G), the same effect as described above can be obtained.

The method of manufacturing the image sensor described above will be explained below.

The lens array 2 and the illumination device 3 are respectively inserted at predetermined positions of the frame 5 shown in FIG. 1. The illumination device 3 is inserted so that the three sides of the light guide member 32 respectively abut against the horizontal and vertical surfaces of the frame 5. In this manner, positioning in the rotation direction of the optical axis can be precisely attained.

Subsequently, the cover glass 4 is adhered by, e.g., an adhesive, to two surfaces, in the longitudinal direction, of the frame 5, which are set in approximately the same plane as the upper surfaces of the projecting portion 322 formed on a portion of the upper surface of the light guide member 32, and the upper surface of the lens array 2, and which are set to sandwich the illumination device 3 and the lens array 2 therebetween.

When the frame 5 and the cover glass 4 are adhered to each other, the lens array 2 and the illumination device 3 can also be fixed in a cluttering-free state.

Finally, the four lead pins 314 of the LED chip 31 are electrically connected to the sensor board by means of, e.g., soldering. In this manner, the above-mentioned image sensor is completed.

Figure 11:
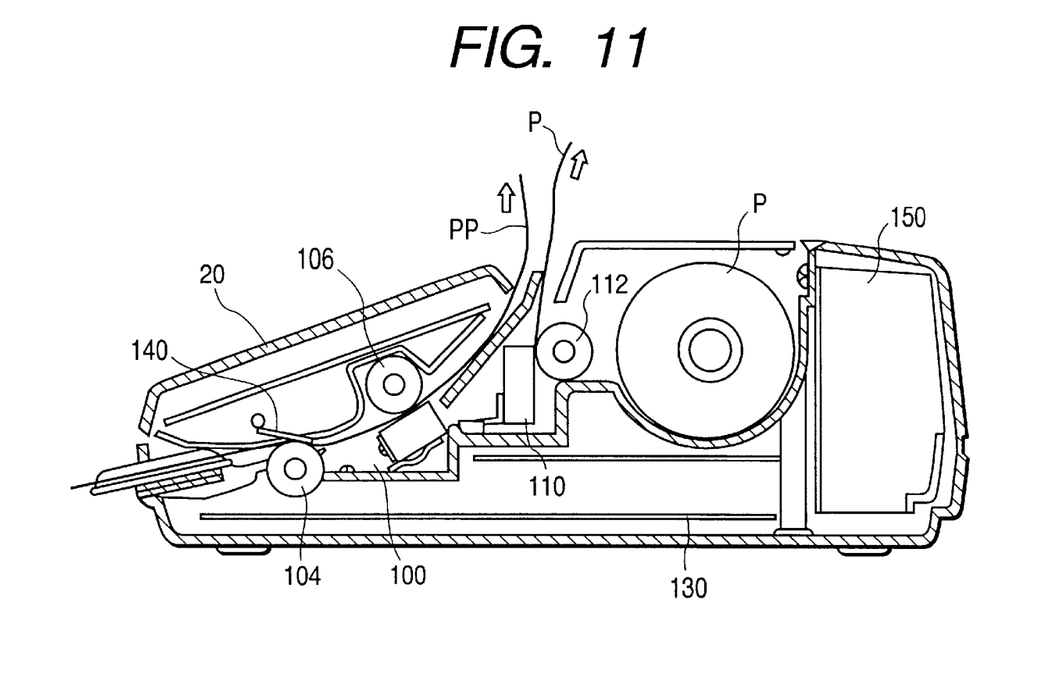
FIG. 11 is a schematic sectional view showing the arrangement of an information processing apparatus using the image sensor.

FIG. 11 is a schematic sectional view showing the arrangement of an information processing apparatus using the above-mentioned image sensor. FIG. 11 exemplifies a printer for recording an image of an original PP on a recording medium P.

In FIG. 11, the apparatus includes an operation panel 20, a sensor unit 100, a feed roller 102, platen rollers 106 and 112, a recording head 110, a system control circuit board 130, a separation piece 140, and a power supply 150.

The overall control of this apparatus is made by a microcomputer arranged on the system control circuit board. Furthermore, the microcomputer also performs control of the above-mentioned image sensor, i.e., ON/OFF control of the illumination device 3 and driving control of the sensor 1. An image signal read by the sensor unit 100 is subjected to processing for recording onto the recording medium P or image processing for externally outputting the image signal by a signal processing circuit on the system control circuit board 130. This signal processing circuit is also controlled by the microcomputer.

Figure 12:
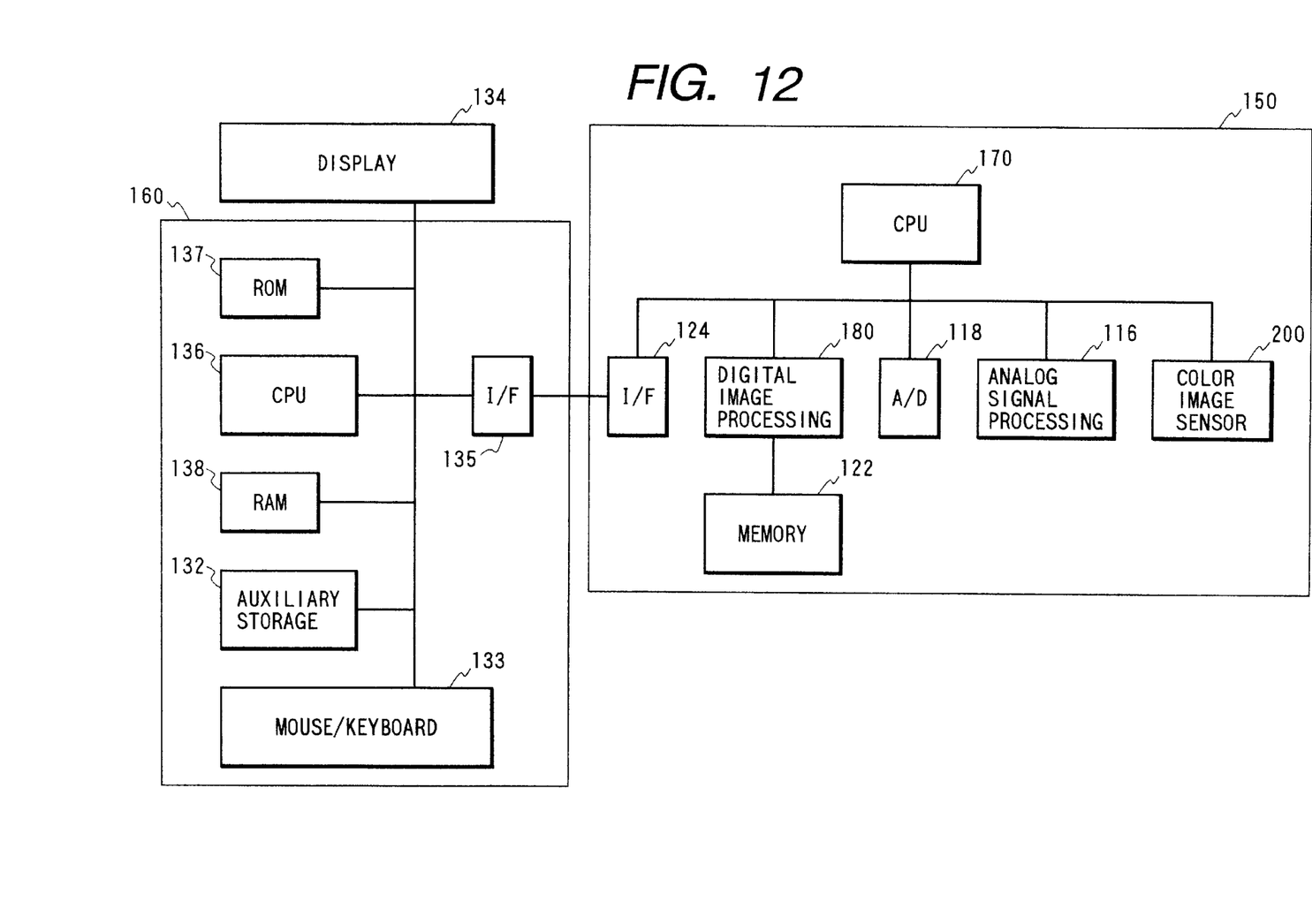
FIG. 12 is a block diagram showing the arrangement of an information processing system using the image sensor.

FIG. 12 shows an example of an information processing apparatus constituted using the image sensor described in each of the above embodiments. In this example, an image reading apparatus 150 with a built-in image sensor 200 is connected to a personal computer 160 to build a system, and read image information is sent to a computer or onto a computer network. This example will be explained below.

Referring to FIG. 12, the image reading apparatus 150 includes a CPU 170 as a first control means for controlling the entire image reading apparatus 150, a color image sensor 200 which is made up of the above-mentioned light sources, CCD line sensor, and the like, and serves as a reading unit for converting an original image into an image signal, and an analog signal processing circuit 116 for performing analog processing such as gain adjustment and the like for an analog image signal output from the color image sensor 200.

Also, the apparatus 150 includes an A/D converter 118 for converting the output from the analog signal processing circuit 116 into a digital signal, a digital image processing circuit 180 for performing image processing such as shading correction, gamma conversion, variable magnification processing, and the like for output data from the A/D converter 118 using a memory 122, and an interface 124 for outputting digital image data processed by the digital image processing circuit 180 to an external apparatus. The interface 124 complies with standards such as SCSI, Bi-Centronics, or the like, which are normally used in a personal computer, and is connected to the personal computer 160. These analog signal processing circuit 116, A/D converter 118, image processing circuit 180, and memory 122 constitute a signal processing means.

The personal computer 160 serving as a second control means equips, as an external storage device or auxiliary storage device 132, a magnetooptical disk drive, a floppy disk drive, or the like. The personal computer 160 includes a display 134 for displaying operations on the personal computer 160, and a mouse/keyboard 133 for inputting commands, and the like to the personal computer. Also, the personal computer 160 includes an interface 135 for exchanging data, commands, and status information of the image reading apparatus with the image reading apparatus. The CPU 136 of the personal computer 160 allows the user to input a reading instruction to the CPU 170 of the image reading apparatus using the mouse/keyboard 133. When a reading instruction is input by the mouse/keyboard 133, a CPU 136 transmits a reading command to the CPU 170 of the image reading apparatus via the interface 135. The CPU 136 of the personal computer 160 controls the CPU 170 of the image reading apparatus in accordance with control program information stored in a ROM 137, and the CPU 170 controls the light source, driving of the CCD and the signal processing means. Note that this control program may be stored in a storage medium such as a magnetooptical disk, floppy disk, or the like loaded into the auxiliary storage device 132, and may be loaded into the personal computer 160 to be executed by the CPU 136.

In this manner, when the above-mentioned image sensor is used in this apparatus, a practical, effective apparatus can be provided.

As described above, in an image sensor which comprises a photoelectric conversion element group for receiving light, an illumination device for irradiating three color light beams of first, second, and third colors in turn from the shorter wavelength side, a lens for imaging light reflected by an original on the photoelectric conversion element group, and the like, The conjugate length TC of the lens is set to satisfy $A \leq TC \leq B$ where A is the conjugate length at the emission wavelength of a light source of the second color, and B is the conjugate length at the emission wavelength of a light source of the third color, whereby the resolution of light imaged on a B photoelectric conversion element group is lower than those of R and G photoelectric conversion element groups, the edge portion of a very thin line in an output image upon reading the very thin line is appropriately blurred, and moiré noise especially conspicuous in a color output image can be reduced, thus obtaining a high-quality image with optimal colors.

Upon reading a monochrome original which requires a high resolution for characters and the like, one or both of the R and G photoelectric conversion element groups are turned on, and the B photoelectric conversion element group is turned off, thus obtaining a desired image. Also, when the R and G photoelectric conversion element groups are simultaneously turned on, the reading time can be shortened.

Since a lens material having chromatic aberration can be used, a bright lens having an aperture angle of 20 (deg.) or more can be selected. For this reason, since the illuminance on the photoelectric conversion element group can be increased, the S/N ratio can be improved, and the reading speed can be improved, thus achieving high performance.

Furthermore, since the illumination device is constituted by a light source and a light guide member for condensing light emitted by the light source and outputting the condensed light in a desired direction, uniform illuminance on the original surface can be obtained by a smaller number of light-emitting elements, thus realizing a great cost reduction.

Also, in an image sensor which comprises a photoelectric conversion element group for receiving light, an illumination device for irradiating three color light beams of first, second, and third colors in turn from the shorter wavelength side, a lens for imaging light reflected by an original on the photoelectric conversion element group, and the like, An optical distance between the photoelectric conversion element group and the lens center is set at ½ of a conjugate length (TC) of light having a wavelength longer than a peak value of the emission wavelength of the second color, and an optical distance between an original support surface of a cover member and the lens center is set at ½ of a conjugate length (TC') of light of the emission wavelength having a conjugate length shorter than TC, whereby even when a short-focal point, equal-magnification type lens array which has an aperture angle of 20 (deg.) or more and has a short depth of focus is used as the lens, depths of focus nearly equal to that of the conventional lens having an aperture angle of 12 (deg.) can be obtained for the individual colors, and a practically satisfactory output image can be obtained upon reading of an original adhered with a picture, which is often used in color image reading.

Since a short-focal point, equal-magnification type lens array having an aperture angle of 20 (deg.) can be used as a lens, the light amount transmission efficiency for guiding light from an original toward the photoelectric conversion element group can be improved, and the reading speed of an original can be increased. Furthermore, since the conjugate length (TC) is shortened, size reductions of the image sensor and the information processing apparatus using the same can be realized.

Furthermore, since the illumination device is constituted by a light source and a light guide member for condensing light emitted by the light source and outputting the condensed light in a desired direction, uniform illuminance on the original surface can be obtained by a smaller number of light-emitting elements, thus realizing a great cost reduction.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
   a plurality of photoelectric conversion elements arranged in a line shape;
   an illumination device having light sources of first, second, and third colors having longer emission wavelengths in the order named, for illuminating an original in a line shape;
   a lens array comprising a plurality of columnar lenses arranged in a line shape, said plurality of columnar lenses for imaging light from the original illuminated by said illumination device onto said plurality of photoelectric conversion elements; and
   a support member for supporting the original,
   wherein an optical distance from a center of the columnar lens to the photoelectric conversion element in a longitudinal direction of the columnar lens is set at ½ of a first conjugate length of light having a wavelength longer than a peak value of the emission wavelength of the light source of the second color, and an optical distance from the center of the columnar lens to an original support surface of said support member is set at ½ of a second conjugate length shorter than the first conjugate length.

2. An apparatus according to claim 1, wherein a color original is read by sequentially and selectively turning on three-color light beams of the first, second, and third colors.

3. An apparatus according to claim 1, wherein when a monochrome original is read, light of the first color or information based on the light of the first color is not used.

4. An apparatus according to claim 3, wherein when a monochrome original is read, at least one of the light sources of the emission wavelengths of the second and third colors is turned on.

5. An apparatus according to claim 1, wherein said lens array comprises a short-focal point, equal-magnification type rod lens having an aperture angle of not less than 20°.

6. An apparatus according to claim 1, wherein said illumination device comprises a light guide member for guiding light from the light sources and outputting the light in a desired direction.

7. An apparatus according to claim 1, wherein the light sources use three different LEDs for respectively emitting first, second, and third light beams.

8. An apparatus according to claim 1, wherein an emission peak wavelength of the first color falls within a range from 450 to 490 nm corresponding to blue, an emission peak wavelength of the second color falls within a range from 510 to 550 nm corresponding to green, and an emission peak wavelength of the third color falls within a range from 590 to 630 nm corresponding to red.

9. An apparatus according to claim 1, wherein the first conjugate length at ½ of which the optical distance from the center of the columnar lens to the photoelectric conversion element in the longitudinal direction of the columnar lens is set, is provided so as to obtain highest resolution for the light having the wavelength longer than the peak value of the emission wavelength of the light source of the second color.

10. An image reading apparatus comprising:
    a plurality of photoelectric conversion elements arranged in a line shape;
    an illumination device having light sources of first, second, and third colors having longer emission wavelengths in the order named, for illuminating an original in a line shape;
    a lens array comprising a plurality of columnar lenses arranged in a line shape, said plurality of columnar lenses for imaging light reflected by the original illuminated by said illumination device onto said plurality of photoelectric conversion elements; and
    a support member for supporting the original,
    wherein an optical distance from a center of the columnar lens to the photoelectric conversion element in a longitudinal direction of the columnar lens is set at ½ of a conjugate length at the emission wavelength of the light source of the third color, and an optical distance from the center of the columnar lens to an original support surface of said support member is set at ½ of a conjugate length at the emission wavelength of the light source of the second color.

11. An apparatus according to claim 10, wherein when a monochrome original is read, light of the first color or information based on the light of the first color is not used.

12. An apparatus according to claim 11, wherein when a monochrome original is read, at least one of the light sources of the emission wavelengths of the second and third colors is turned on.

13. An apparatus according to claim 10, wherein said lens array comprises a short-focal point, equal-magnification type rod lens having an aperture angle of not less than 20°.

14. An apparatus according to claim 10, wherein said illumination device comprises a light guide member for guiding light from the light sources and outputting the light in a desired direction.

15. An apparatus according to claim 10, wherein the light sources use three different LEDs for respectively emitting first, second, and third light beams.

16. An apparatus according to claim 10, wherein an emission peak wavelength of the first color falls within a range from 450 to 490 nm corresponding to blue, an emission peak wavelength of the second color falls within a range from 510 to 550 nm corresponding to green, and an emission peak wavelength of the third color falls within a range from 590 to 630 nm corresponding to red.

17. An apparatus according to claim 10, wherein a color original is read by sequentially and selectively turning on three-color light beams of the first, second, and third colors.

18. An apparatus according to claim 10, wherein the conjugate length at ½ of which the optical distance from the center of the columnar lens to the photoelectric conversion element in a longitudinal direction of the columnar lens is set, is provided so as to obtain highest resolution for the emission wavelength of the light source of the third color, and the conjugate length at ½ of which the optical distance from the center of the columnar lens to the original support surface of said support member is set, is provided so as to obtain highest resolution for the emission wavelength of the light source of the second color.

19. An image reading apparatus comprising:
a plurality of photoelectric conversion elements arranged in a line shape;
an illumination device having light sources of first, second, and third colors having longer emission wavelengths in the order named, for illuminating an original in a line shape; and
a lens array comprising a plurality of columnar lenses arranged in a line shape, said plurality of columnar lenses for imaging light reflected by the original illuminated by said illumination device onto said plurality of photoelectric conversion elements,
wherein a conjugate length TC of the columnar lens is set to satisfy $A \leq TC \leq B$ where A is the conjugate length at the emission wavelength of the light source of the second color, and B is the conjugate length at the emission wavelength of the light source of the third color.

20. An apparatus according to claim 19, wherein a color original is read by sequentially and selectively turning on three-color light beams of the first, second, and third colors.

21. An apparatus according to claim 19, wherein said lens array comprises a short-focal point, equal-magnification type rod lens having an aperture angle of not less than 20°.

22. An apparatus according to claim 19, wherein said illumination device comprises a light guide member for guiding light from the light sources and outputting the light in a desired direction.

23. An apparatus according to claim 19, wherein the light sources use three different LEDs for respectively emitting first, second, and third light beams.

24. An apparatus according to claim 19, wherein an emission peak wavelength of the first color falls within a range from 450 to 490 nm corresponding to blue, an emission peak wavelength of the second color falls within a range from 510 to 550 nm corresponding to green, and an emission peak wavelength of the third color falls within a range from 590 to 630 nm corresponding to red.

25. An apparatus according to claim 19, wherein when a monochrome original is read, light of the first color or information based on the light of the first color is not used.

26. An apparatus according to claim 25, wherein when a monochrome original is read, at least one of the light sources of the emission wavelengths of the second and third colors is turned on.

27. An apparatus according to claim 19, wherein the conjugate length A is provided so as to obtain highest resolution for the emission wavelength of the light source of the second color, and the conjugate length B is provided so as to obtain highest resolution for the emission wavelength of the light source of the third color.

28. An image reading system comprising:
a plurality of photoelectric conversion elements arranged in a line shape;
an illumination device having light sources of first, second, and third colors having longer emission wavelengths in the order named, for illuminating an original in a line shape;
a lens array comprising a plurality of columnar lenses arranged in a line shape, said plurality of columnar lenses for imaging light from the original illuminated by said illumination device onto said plurality of photoelectric conversion elements;
a support member for supporting the original; and
a control unit adapted to control said photoelectric conversion elements and said illumination device,
wherein an optical distance from a center of the columnar lens to the photoelectric conversion element in a longitudinal direction of the columnar lens is set at ½ of a first conjugate length of light having a wavelength longer than a peak value of the emission wavelength of the light source of the second color, and an optical distance from the center of the columnar lens to an original support of said support member is set at ½ of a second conjugate length shorter than the first conjugate length.

29. A system according to claim 28, wherein said lens array comprises a short-focal point, equal-magnification type rod lens having an aperture angle of not less than 20°.

30. A system according to claim 28, wherein said illumination device comprises a light guide member for guiding light from the light sources and outputting the light in a desired direction.

31. A system according to claim 28, wherein the light sources use three different LEDs for respectively emitting first, second, and third light beams.

32. A system according to claim 28, wherein an emission peak wavelength of the first color falls within a range from 450 to 490 nm corresponding to blue, an emission peak wavelength of the second color falls within a range from 510 to 550 nm corresponding to green, and an emission peak wavelength of the third color falls within a range from 590 to 630 nm corresponding to red.

33. An image reading system according to claim 28, further comprising a driving unit adapted to shift a positional relationship between the original and said plurality of photoelectric conversion elements.

34. A system according to claim 28, wherein when a monochrome original is read, light of the first color or information based on the light of the first color is not used.

35. A system according to claim 34, wherein when a monochrome original is read, at least one of the light sources of the emission wavelengths of the second and third colors is turned on.

36. A system according to claim 28, wherein a color original is read by sequentially and selectively turning on three-color light beams of the first, second, and third colors.

37. A system according to claim 28, wherein the first conjugate length at ½ of which the optical distance from the center of the columnar lens to the photoelectric conversion element in the longitudinal direction of the columnar lens is set, is provided so as to obtain highest resolution for the light having the wavelength longer than the peak value of the emission wavelength of the light source of the second color.

38. An image reading system comprising:
a plurality of photoelectric conversion elements arranged in a line shape;
an illumination device having light sources of first, second, and third colors having longer emission wavelengths in the order-named, for illuminating an original in a line shape;

a lens array comprising a plurality of columnar lenses arranged in a line shape, said plurality of columnar lenses for imaging light reflected by the original illuminated by said illumination device onto said plurality of photoelectric conversion elements;

a support member for supporting the original; and a control unit adapted to control said plurality of photoelectric conversion elements and said illumination device, wherein an optical distance from a center of the columnar lens to the photoelectric conversion element in a longitudinal direction of the columnar lens is set at ½ of a conjugate length at the emission wavelength of the light source of the third color, and an optical distance from the center of the columnar lens to an original support surface of by said support member is set at ½ of a conjugate length at the emission wavelength of the light source of the second color.

39. A system according to claim 38, wherein the light sources use three different LEDs for respectively emitting first, second, and third light beams.

40. A system according to claim 38, wherein an emission peak wavelength of the first color falls within a range from 450 to 490 nm corresponding to blue, an emission peak wavelength of the second color falls within a range from 510 to 550 nm corresponding to green, and an emission peak wavelength of the third color falls within a range from 590 to 630 nm corresponding to red.

41. A system according to claim 38, wherein a color original is read by sequentially and selectively turning on three-color light beams of the first, second, and third colors.

42. A system according to claim 38, wherein when a monochrome original is read, light of the first color or information based on the light of the first color is not used.

43. A system according to claim 42, wherein when a monochrome original is read, at least one of the light sources of the emission wavelengths of the second and third colors is turned on.

44. A system according to claim 38, wherein said rod lens array comprises a short-focal point, equal-magnification type lens having an aperture angle of not less than 20°.

45. A system according to claim 38, wherein said illumination device comprises a light guide member for guiding light from the light sources and outputting the light in a desired direction.

46. An image reading system according to claim 38, further comprising a driving unit adapted to shift a positional relationship between the original and said plurality of photoelectric conversion elements.

47. A system according to claim 38, wherein the conjugate length at ½ of which the optical distance from the center of the columnar lens to the photoelectric conversion element in a longitudinal direction of the columnar lens is set, is provided so as to obtain highest resolution for the emission wavelength of the light source of the third color, and the conjugate length at ½ of which the optical distance from the center of the columnar lens to the original support surface of said support member is set, is provided so as to obtain highest resolution for the emission wavelength of the light source of the second color.

48. An image reading system comprising:

a plurality of photoelectric conversion elements arranged in a line shape;

an illumination device having light sources of first, second, and third colors having longer emission wavelengths in the order named, for illuminating an original in a line shape;

a lens array comprising a plurality of columnar lenses arranged in a line shape, said plurality of columnar lenses for imaging light from the original illuminated by said illumination device onto said plurality of photoelectric conversion elements; and a control unit adapted to control said plurality of photoelectric conversion elements and said illumination device, wherein a conjugate length TC of the columnar lens is set to satisfy $A \leq TC \leq B$ where A is the conjugate length at the emission wavelength of the light source of the second color, and B is the conjugate length at the emission wavelength of the light source of the third color.

49. A system according to claim 48, wherein a color original is read by sequentially and selectively turning on three-color light beams of the first, second, and third colors.

50. A system according to claim 48, wherein when a monochrome original is read, light of the first color or information based on the light of the first color is not used.

51. A system according to claim 50, wherein when a monochrome original is read, at least one of the light sources of the emission wavelengths of the second and third colors is turned on.

52. A system according to claim 48, wherein said lens array comprises a short-focal point, equal-magnification type rod lens having an aperture angle of not less than 20°.

53. A system according to claim 48, wherein said illumination device comprises a light guide member for guiding light from the light sources and outputting the light in a desired direction.

54. A system according to claim 48, wherein the light sources use three different LEDs for respectively emitting first, second, and third light beams.

55. A system according to claim 48, wherein an emission peak wavelength of the first color falls within a range from 450 to 490 nm corresponding to blue, an emission peak wavelength of the second color falls within a range from 510 to 550 nm corresponding to green, and an emission peak wavelength of the third color falls within a range from 590 to 630 nm corresponding to red.

56. An image reading system according to claim 48, further comprising a driving unit adapted to shift a positional relationship between the original and said plurality of photoelectric conversion elements.

57. A system according to claim 48, wherein the conjugate length A is provided so as to obtain highest resolution for the emission wavelength of the light source of the second color, and the conjugate length B is provided so as to obtain highest resolution for the emission wavelength of the light source of the third color.

58. An image reading apparatus comprising:

a photoelectric conversion element;

an illumination device for irradiating first and second color lights having different emission wavelengths respectively;

an image member for imaging light from an original illuminated with each of the first and second color lights by said illumination device onto said photoelectric conversion element; and a support member for supporting the original, wherein relative positions of said photoelectric conversion element, said imaging member and said support member are set so that an optical distance from said photoelectric conversion element to an original support surface of said support member falls between a conjugate length of the first color light and a conjugate length of the second color light, and thereby images of the first and second colors are picked up by said photoelectric conversion element at said optical distance.

59. An apparatus according to claim 58, further comprising a driving unit adapted to shift a positional relationship between the original and said photoelectric conversion element.

60. An apparatus according to claim 58, wherein said apparatus reads a color original by irradiating the first and second color lights one after another by said illumination device.

61. An apparatus according to claim 58, wherein said apparatus reads a monochromatic original without irradiating the first color light or without using information obtained from the first color light.

62. An apparatus according to claim 58, wherein said imaging member is formed with a short-focal point and equal-magnification type rod lens having an aperture angle of not less than 20°.

63. An apparatus according to claim 58, wherein said illumination device includes a light guide member for guiding light from a light source and emitting the guided light in a desired direction.

64. An apparatus according to claim 63, wherein the source comprises LEDs for respectively emitting the first and second color lights.

65. An apparatus according to claim 58, wherein said illumination device includes LEDs for respectively emitting the first and second color lights.

66. An apparatus according to claim 58, wherein the conjugate length of the first color light and the conjugate length of the second color light between which the optical distance from said photoelectric conversion element to the original support surface of said support member falls, are provided so as to obtain highest resolution for the first color light and highest resolution for the second color light, respectively.

67. An image reading apparatus comprising:
a photoelectric conversion element;
a light source arranged to emit lights of first, second and third colors having longer wavelengths in this order;
an image forming member arranged to form light from an original illuminated by said light source into an image on said photoelectric conversion element; and
a support member arranged to support the original;
wherein a distance from said photoelectric conversion element to an original support surface of said support member is set so as to fall between conjugate lengths which are provided so as to obtain highest resolution for two colors among the first, second and third colors, respectively.

68. An apparatus according to claim 67, wherein a distance from a center of said image forming member to said photoelectric conversion element is set at ½ of a conjugate length with which said image forming member obtains highest resolution for the light of the third color, and a distance from the center of said image forming member to the original support surface of said support member is set at ½ of a conjugate length with which said image forming member obtains highest resolution for a light of wavelength shorter than that of the light of the third color.

69. An apparatus according to claim 68, wherein the distance from the center of said image forming member to the original support surface of said support member is set at ½ of a conjugate length with which said image forming member obtains highest resolution for the light of the second color.

70. An apparatus according to claim 67, wherein a distance from said photoelectric conversion element to the original support surface of said support member is set to be longer than a conjugate length with which said image forming member obtains highest resolution for the light of the second color, and shorter than a conjugate length with which said image forming member obtains highest resolution for the light of the third color.

71. An apparatus according to claim 67, wherein said apparatus turns on said light source so as to emit the lights of the first, second and third colors in order and reads a color original under emission of the light of each color.

72. An apparatus according to claim 67, wherein said apparatus does not make use of the light of the first color or information provided from the light of the first color when said apparatus reads a monochrome original.

73. An apparatus according to claim 72, wherein said light source emits the light of at least one of the second and third colors when the monochrome original is read.

74. An apparatus according to claim 67, wherein said image forming member includes a rod lens of a short-focal point and equal-magnification type, having an aperture angle of not less than 20 degrees.

75. An apparatus according to claim 67, wherein said light source includes a light guide member arranged to guide a light from a light emission element to irradiate the guided light in a desired direction.

76. An apparatus according to claim 75, wherein said light emission element includes three kinds of LEDs which emit lights of wavelengths of the first, second and third colors respectively.

77. An apparatus according to claim 67, wherein a peak wavelength of the first color falls within a range from 450 to 490 nm corresponding to blue, a peak wavelength of the second color falls within a range from 510 to 550 nm corresponding to green, and a peak wavelength of the third color falls within a range from 590 to 630 nm corresponding to red.

78. An apparatus according to claim 67, further comprising a movement unit arranged to shift a relative position between the original and said photoelectric conversion element.

* * * * *

UNITED STATES PATENT AND TRADEMARK OFFICE
CERTIFICATE OF CORRECTION

PATENT NO. : 6,556,317 B2
DATED : April 29, 2003
INVENTOR(S) : Masami Tabata et al.

It is certified that error appears in the above-identified patent and that said Letters Patent is hereby corrected as shown below:

Column 5,
Line 27, "potion" should read -- portion --.

Column 8,
Line 60, "like," should read -- like. --.

Column 12,
Line 66, "order-named," should read -- order named, --.

Signed and Sealed this

Twenty-first Day of October, 2003

JAMES E. ROGAN
*Director of the United States Patent and Trademark Office*